J. DODGE.
Coffee Pot.

No. 105,051.

Patented July 5, 1870

Witnesses
E. J. Sommer
Phil T. Dodge

Inventor
J. Dodge
by Dodge & Munn
his Atty.

UNITED STATES PATENT OFFICE.

JOHNSON DODGE, OF NEW ORLEANS, LOUISIANA.

COFFEE-POT.

Specification forming part of Letters Patent No. 105,051, dated July 5, 1870.

*To all whom it may concern:*

Be it known that I, JOHNSON DODGE, of New Orleans, in the parish of Orleans and State of Louisiana, have invented certain Improvements in Coffee-Pots, of which the following is a specification, reference being had to the accompanying drawing.

My present invention relates to certain improvements upon the pot for which Letters Patent were granted to me, bearing date the 9th day of November, 1869, and numbered 96,558; and consists, first, in the use of a float, with a stem protruding through and above the top, to indicate the amount of liquid coffee in the pot; second, in making the central upright tube fixed and entire; and third, in the application of various cocks, and other details, as hereinafter described.

Figure 1:
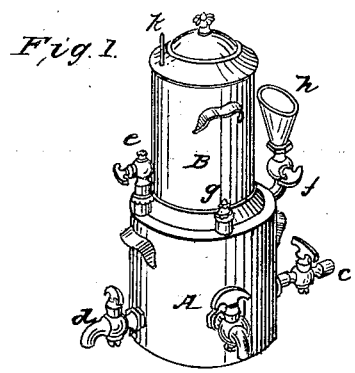
Figure 2:
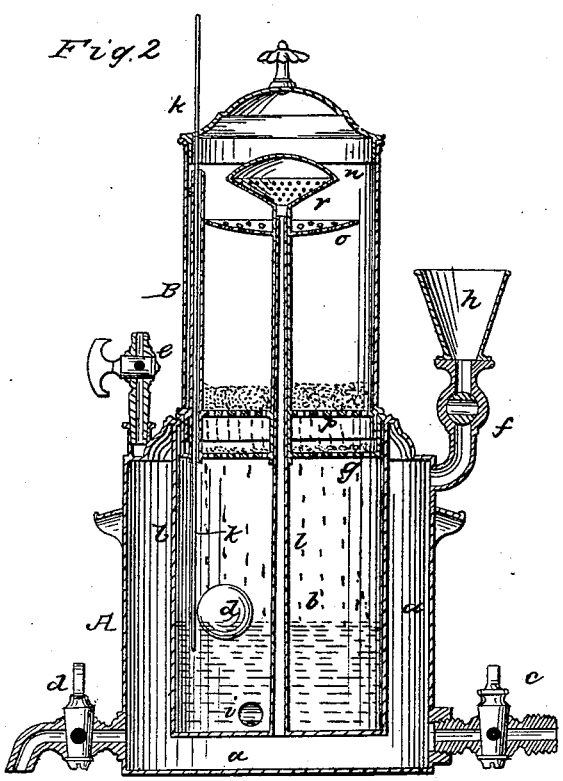

Figure 1 is a perspective view of my pot complete, and Fig. 2 a vertical section through the center of the same.

The body of my pot I construct, as in my previous patent, by suspending a cylindrical vessel, $b$, within a cylindrical vessel, A, by means of an annular rim or ring connecting the upper edges of the two, so as to leave a steam-tight space or chamber, $a$, between the vessels, as shown in Fig. 2. To the upper part of the vessel A I secure a cock, $f$, having a funnel, $h$, attached, and into or through which water is poured to occupy the space $a$; and through the ring which connects the two vessels I insert a cock, $e$, to permit the escape of air when the space $a$ is being filled with water, and a safety-valve, $g$, to prevent the pressure of the steam from becoming so great as to burst or rupture the pot. To the vessel A, near its bottom, I apply a cock, $c$, through which steam is admitted from a boiler or other steam-generator, through the water, into the upper part of the space or chamber $a$, for the purpose of heating the water; and I also provide another cock, $d$, by which hot water may be drawn from the space $a$ for use. Near the bottom of the body I also apply a third cock, $i$, which extends through to the vessel $b$, and through which the contents of said vessel may be drawn off, as hereinafter described. To the center of the vessel $b$ I secure a long vertical tube, $l$, communicating at its lower end with the space $a$, and into the upper end of the vessel $b$ I place a closely-fitting dish, $g$, having a perforated bottom, and through the center of which the tube $l$ passes, as shown in Fig. 2.

I next provide a cylindrical body, B, provided with a tightly-fitting top and a perforated bottom, and also with a flange or rim on its lower end, which may be fitted tightly into the dish $g$, as shown in Fig. 2. The tube $b$ is made of sufficient length to reach nearly to the top of the body B, and it has placed upon its upper end a cap or hood, $n$, the under side of which is perforated, and also a perforated disk, $o$, as shown in Fig. 2. I also provide a hollow ball or float, $j$, provided with a long stem, $k$, and through the dish $g$, and the bottom and top of the body B, I make holes to receive said stem, and before putting the pot together I place the float in the vessel or chamber $b$, and pass the stem $k$ up through the body B when placed in position, so that its end projects above the top of the body, as shown in Figs. 1 and 2, so that, when the liquid in the vessel $b$ rises or falls, the stem will be caused to protrude more or less, and thus indicate at all times the amount or height of liquid contained in the vessel.

In using or operating my pot, the proper amount of ground coffee is placed within the body B, and the top closed. The cocks $e$ and $f$ are then opened and the requisite amount of water poured in through the funnel $h$, and the cocks again closed. The cock $c$, which has been previously connected with the steam-generator, is then opened, and the steam admitted into and through the water, so as to occupy the upper portion of the space or chamber $a$. The steam passing through the water, and then remaining above and in contact with the same, heats it to the proper temperature, and at the same time forces it, (mixed with more or less steam,) up through the pipe $l$, against the under side of the hood $n$, which deflects it outward and downward through the perforations of the hood and disk $o$, which latter divides it into fine spray, in which form, and still hot, it falls upon the coffee-grains below. The spray, thus falling upon the coffee-grains, thoroughly saturates them, and then, percolating through the mass, falls into the vessel $b$, strongly impregnated with the flavor or essence of the coffee, and from whence it may be drawn off, through cock $i$, for use.

The liquid coffee thus produced is of great strength, and in a perfectly clear condition, entirely free from particles of the coffee-grains, or other substances, and when deposited in the vessel $b$ is kept hot for use by the surrounding steam and water in space $a$.

The object of the perforated dish or diaphragm $g$ is to retain any particles of solid matter that may find their way through the bottom of body B.

Having thus described my invention, what I claim is—

1. In a steam coffee-maker, consisting of the vessels A, B, and $b$, constructed and arranged substantially as herein described, the float $j$, with its indicating-stem $k$, when arranged therein as shown and described, and for the purpose set forth.

2. In combination with the exterior vessel A, and the interior vessel $b$, the funnel-mouthed cock $h$, applied to the water-chamber between these vessels, substantially as and for the purpose set forth.

JOHNSON DODGE.

Witnesses:
L. W. APPLEGATE,
JULIAN MICHEL.